a2 United States Patent
Thompson et al.

(10) Patent No.: US 8,341,108 B2
(45) Date of Patent: Dec. 25, 2012

(54) KIND CLASSIFICATION THROUGH EMERGENT SEMANTIC ANALYSIS

(75) Inventors: Donald Thompson, Sammamish, WA (US); Alexander S. Stojanovic, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 645 days.

(21) Appl. No.: 12/480,821

(22) Filed: Jun. 9, 2009

(65) Prior Publication Data

US 2010/0312743 A1 Dec. 9, 2010

(51) Int. Cl.
*G06F 17/16* (2006.01)
*G06F 17/18* (2006.01)
*G06K 9/62* (2006.01)

(52) U.S. Cl. .............................. 706/52; 706/20; 382/224
(58) Field of Classification Search .................. 706/52
See application file for complete search history.

(56) References Cited

U.S. PATENT DOCUMENTS 6,189,002 B1 * 2/2001 Roitblat ............................ 1/1
6,418,433 B1 7/2002 Chakrabarti et al.
6,564,210 B1 5/2003 Korda et al.
7,379,932 B2 5/2008 Agrawal et al.
2004/0205049 A1 10/2004 Aggarwal
2007/0185865 A1 8/2007 Budzik et al.

OTHER PUBLICATIONS

Chen et al., "Web Mining: Machine Learning for Web Applications", pp. 289-329, http://ai.arizona.edu/go/intranet/papers/WebMining.pdf.
Lawrence, Steve, "Context in Web Search", IEEE Data Engineering Bulletin, vol. 23, No. 3, pp. 25-32, 2000, http://www.iicm.tugraz.at/thesis/cguetl_diss/literatur/Kapitel02/References/Lawrence_2000/lawrence00context.pdf.

* cited by examiner

*Primary Examiner* — Alan Chen
*Assistant Examiner* — Nathan Brown, Jr.
(74) *Attorney, Agent, or Firm* — Microsoft Corporation

(57) ABSTRACT

A goal of computer development is to understand the user and the data with which the user is engaged. If a better understanding of the user and their data can be accomplished, then additional information and features may be provided based upon the user's intent and interests. Accordingly, as provided herein, Kinds may be created as digital representations of everyday things. Kind classifications may be created to characterize the Kinds. The Kind classifications may be updated based upon user interaction to further characterize Kinds with which the user has interacted. For example, when a user writes an email about using orange peels as an air freshener, an orange Kind classification may be updated to reflect that an orange may be used as an air freshener. Kind feature vectors and user feature vectors may be created to represent the probabilities that the Kind or user relates to particular characteristics.

20 Claims, 11 Drawing Sheets

KIND CLASSIFICATION THROUGH EMERGENT SEMANTIC ANALYSIS

BACKGROUND

Many users interact with computer resources daily. The user's experience of these computer resources may involve navigation, discovery, and interaction with data items (e.g., files, emails, images, web searches, etc.). For example, the user may access their work email or perform a web search using a mobile device. Unfortunately, the user's experience may be limited because the devices through which the user and computer resources interact may not understand the user's interests, detailed information of the data items with which the user interacts, and/or the context with which the user interacts with the data items. For example, when a user checks their calendar for an upcoming trip through a work computer, the work computer may not understand the context of the user's interactions and thus may not understand that it may be advantageous to provide the user with additional information, such as itinerary information.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A technique for updating a Kind classification based upon emergent semantic analysis is disclosed herein. A Kind may be interpreted as the digital representation of everyday things (e.g., a desk Kind may be a digital representation of a desk; an orange Kind may be a digital representation of an orange—the color and/or the fruit). A Kind classification may be interpreted as information defining the characteristics of a Kind through descriptors. Emergent semantic analysis may be interpreted as defining the meaning of a Kind through its observed use (e.g., user interaction within a computing environment). That is, a Kind classification of a Kind may be updated based upon user interaction with a data item associated with the Kind. For example, additional descriptors may be associated with the Kind classification based upon emergent semantic analysis. A descriptor may be interpreted as information characterizing the Kind associated with the Kind classification. In one example, descriptors may be characterizations determined based upon emergent semantic analysis techniques. In another example, descriptors may be derived from extracted features (e.g., extracted metadata of a file, execution of a Kind classification module).

Usage data relating to a Kind classification may be received. The usage data may correspond to user interaction with a data item associated with a Kind characterized by the Kind classification. For example, a user may send an email describing uses of an orange. The concept of an orange may be digitally represented as an orange Kind, wherein an orange Kind classification characterizes the orange Kind. The data item may be web content, local content, subscription content, shared content, a stream of data, and/or other data content (e.g., files, emails, blogs, newsfeeds, etc.).

A descriptor may be associated with the Kind classification based upon the usage data. For example, a user may send an email describing the use of orange peels as an air freshener. An orange Kind classification characterizing an orange Kind (a digital representation of the orange) may be updated based upon the information within the email. In one example of updating the orange Kind classification, one or more descriptors may be derived from the email. For example, it may be apparent, through semantic analysis, that the orange Kind relates to air fresheners based upon an analysis of the email's text, thus a descriptor may be created characterizing the orange Kind as an air freshener. The one or more descriptors may be associated with the orange Kind classification, thus further characterizing the orange Kind based upon usage data of writing within the email.

It may be appreciated that classification modules may be executed upon data items to associate one or more descriptors with the Kind classification. For example, an image Kind classification module may be executed upon data items associated with an image Kind to further characterize the image Kind by associating additional descriptors with an image Kind classification. In another example, an audio Kind classification module may be executed upon data items associated with an audio Kind to further characterize the audio Kind by associating additional descriptors with an audio Kind classification.

A Kind feature vector may be associated with a Kind characterized by the Kind classification. For example, the Kind feature vector may be a data structure representation of the conceptual space within which the Kind digitally exists. One or more dimensions may be created within the Kind feature vector. A dimension, for example, may be indicative of a characteristic. Probabilistic values may be assigned to the one or more dimensions, wherein a probabilistic value is based upon the probability the Kind relates to a characteristic of the dimension. For example, an orange Kind feature vector may be created for an orange Kind. A fruit dimension, a color dimension, a vacation dimension, and/or hundreds of thousands of other dimensions may be created within the orange Kind feature vector.

The dimensions may be assigned a probabilistic value based upon the probability the orange Kind relates to the characteristic (e.g., how probable is it that an orange relates to a fruit, how probable is it that an orange relates to a color, how probable is it that an orange relates to an air freshener). Probabilistic value, for example, may range from 0 to 1, wherein 1 is a high probability the Kind relates to the characteristic and 0 is a low probability the Kind relates to the characteristic (e.g., 0.9 may be assigned to the fruit dimension because of a high probability the orange Kind relates to a fruit and 0.04 may be assigned to the vacation dimension because of a low probability the orange Kind relates to a vacation). It may be appreciated that any range may be utilized in designating probabilistic values. In one example, the probabilistic values may be derived from one or more descriptors within the Kind classification. The Kind feature vector may be updated based upon usage data relating to the Kind classification. For example, an updated probabilistic value may be reassigned to one or more dimensions of a Kind feature vector.

A user feature vector may be created based upon one or more Kind vectors associated with the user. For example, a Kind feature vector may be associated with a user based upon user interaction and/or ownership of data items having a Kind characterized by the Kind feature vector. One or more dimensions may be created within the user feature vector, wherein respective dimensions may be assigned a probabilistic value based upon the probability the user relates to a characteristic of the dimension. For example, a weighted sum may be performed across one or more Kind feature vectors to determine probabilistic values (e.g., summing probabilistic values of a particular dimension across one or more Kind feature vectors).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
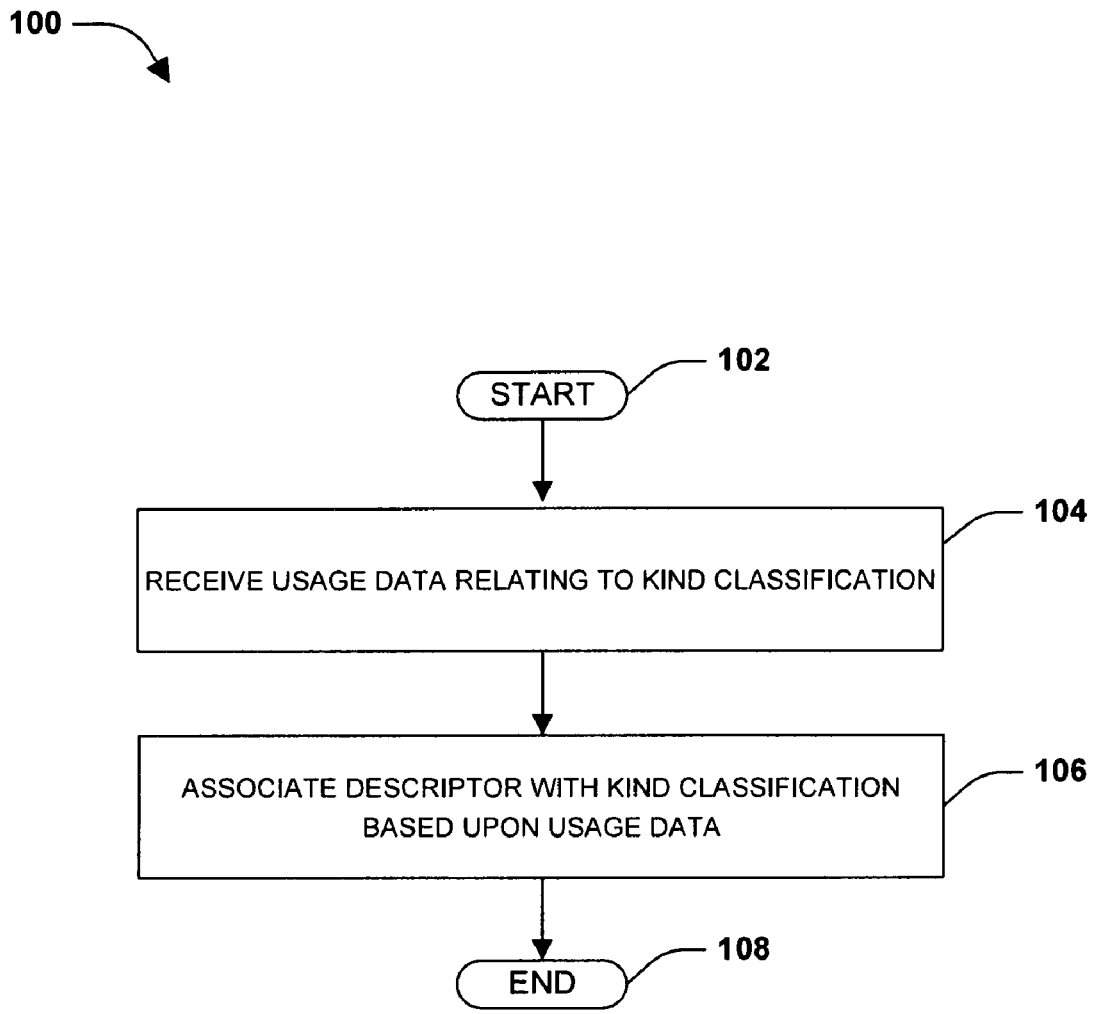
FIG. 1 is a flow chart illustrating an exemplary method of updating a Kind classification based upon emergent semantic analysis.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

A user's experience of computer resources may involve interacting with data items (e.g., web content, local content, subscription content, and/or shared content). The user's experience may be enhanced by understanding the user's interests and classifying data items with which the user interacts. For example, if a user writes an email regarding the use of orange peels as an air freshener, then a digital representation of an orange (e.g., an orange Kind) may be classified as relating to an air freshener and/or a home cleaning product. The user may also be classified as having an interest in air fresheners and/or home cleaning products. This classification allows additional information and more advanced interactions to be presented to users.

Among other things, a technique for updating a Kind classification based upon emergent semantic analysis is provided herein. Usage data relating to a Kind classification may be received. In one example, a user may send an email describing the uses of an orange. In another example, a user may rename an image of a park. In yet another example, a user may create an audio file pertaining to a recent work meeting, wherein the user describes the audio file through metadata of the audio file. These are a few examples of a user interacting with data items (e.g., an email, an image, an audio file) associated with Kinds (e.g., an orange Kind, a park image Kind, an audio file Kind) characterized by Kind classifications (e.g., orange Kind classification, park image Kind classification, audio file Kind classification). The user interaction may be utilized in further characterizing associated Kinds by updating their respective Kind classifications with new descriptors. For example, a descriptor may be added to the orange Kind classification based upon a user describing uses of an orange within an email. A Kind feature vector may be created based upon the Kind classifications and its descriptors. One or more Kind feature vectors may be utilized in creating a user feature vector that may characterize a user's interests.

It may be appreciated that a feature vector (e.g., a Kind feature vector and/or a user feature vector) may represent the conceptual space a Kind or a user occupies. A feature vector may be created based upon Mutual Information theory and dimensionality reduction techniques. In one example of creating a Kind feature vector, discriminating (salient) features for all Kind data may be determined and then evaluated against a Kind.

One embodiment of updating a Kind classification based upon emergent semantic analysis is illustrated by an exemplary method 100 in FIG. 1. At 102, the method begins. At 104, usage data relating to a Kind classification may be received. For example, a user may write a text message regarding painting a room in their house orange. A digital representation of orange may exist as an orange Kind, wherein an orange Kind classification may characterize the orange Kind. The usage data may be the text message and the text therein may be extracted as features utilized in creating descriptors.

At 106, a descriptor may be associated with the Kind classification based upon the usage data. The descriptor may be created based upon analyzing the usage data using, for example, emergent semantic analysis techniques. For example, the text within the text message may be analyzed to determine the context within which the orange Kind is used (e.g., orange is a paint color). A paint color descriptor may be created to further characterize the orange Kind. The paint color descriptor may be associated with the orange Kind classification, thus characterizing the orange Kind as relating to a paint color. In this way, the orange Kind classification is updated based upon emergent semantic analysis of the user's text message. The orange Kind classification may be utilized in understanding the orange Kind (e.g., machine learning techniques may utilize the orange Kind classification to understand what an orange is).

It may be appreciated that the Kind classification may be updated based upon extracted features of a data item associated with the Kind characterized by the Kind classification. For example, a classification module may be executed upon the data item to extract features. The extracted features may be used in associating one or more descriptors with the Kind classification. In one example, an image Kind classification module may be executed upon a park image having a park image Kind characterized by a park image Kind classification. One or more descriptors may be associated with the park image Kind classification based upon extracted features (e.g., a color ratio feature, a color saturation feature, a shape feature, and/or other features extracted from the park image). In another example, an audio Kind classification module may be executed upon a meeting audio file having a meeting audio Kind characterized by a meeting audio Kind classification. One or more descriptors may be associated with the meeting audio Kind classification based upon extracted features (e.g., a signal to noise ratio feature, a zero crossing feature, an f domain analysis feature, and/or other features extracted from the audio file and/or metadata).

A Kind feature vector may be associated with a Kind based upon a Kind classification characterizing the Kind. One or more dimensions may be created within the Kind feature vector. A dimension may represent a characteristic (e.g., fruit, color, cleaning product, air freshener, sports, etc.) that the Kind may or may not relate to in varying degrees. The one or more dimensions may represent up to and beyond millions of potential characteristics that the Kind may have a probability of relating to. Probabilistic values may be assigned to respective dimensions based upon the probability the Kind relates to a characteristic of a dimension (e.g., probabilistic values may be derived from a set of initial features and/or descriptors). For example, a 0.80 probabilistic value may be assigned to a fruit dimension of an orange Kind feature vector because descriptors within an orange Kind may reveal that the orange Kind has a high probability of relating to a fruit. A 0.04 probabilistic value may be assigned to a vacation dimension because descriptors of the orange Kind may reveal that the orange Kind has a low probability of relating to a vacation. The Kind feature vector of a Kind may be analyzed to determine probabilities that the Kind relates to one or more characteristics. At 108, the method ends.

Figure 2:
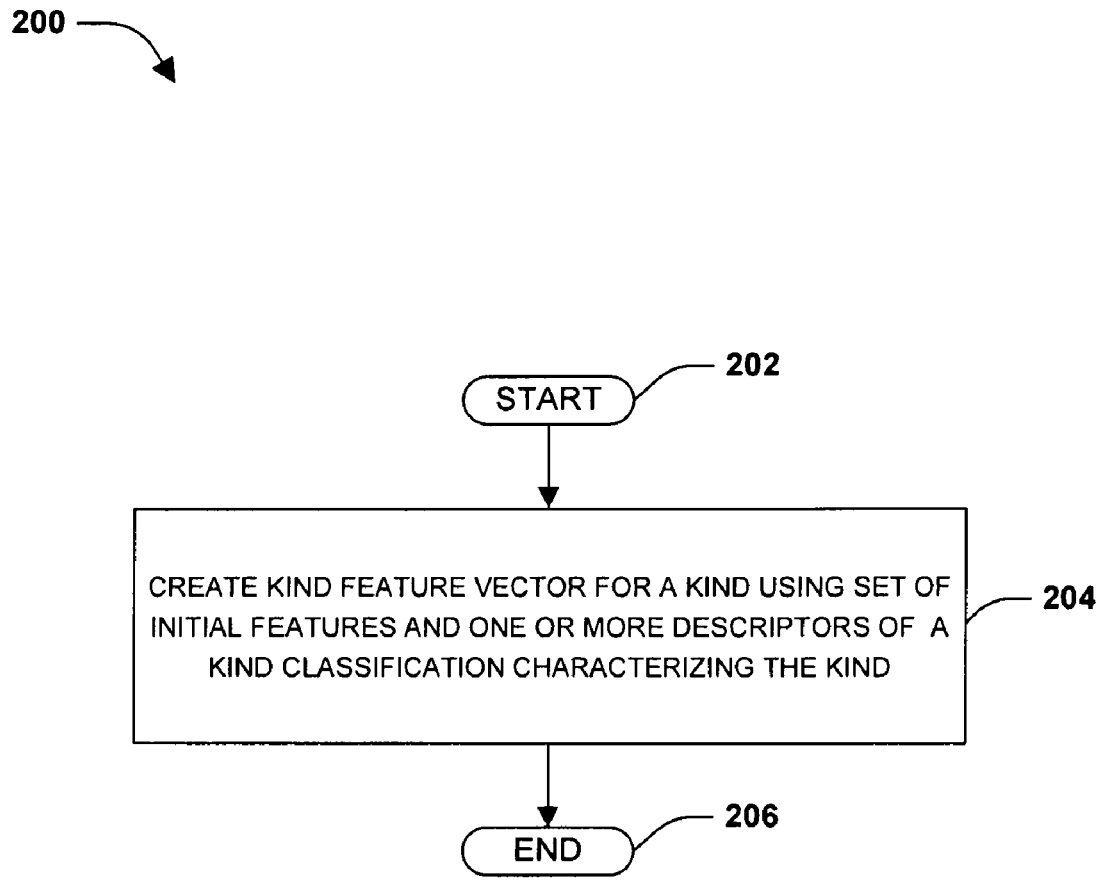
FIG. 2 is a flow chart illustrating an exemplary method of creating a feature vector.

One embodiment of creating a feature vector is illustrated by an exemplary method 200 in FIG. 2. At 202, the method begins. At 204, a Kind feature vector may be created for a Kind using a set of initial features and one or more descriptors of a Kind classification characterizing the Kind. It may be appreciated that the set of initial features may be features extracted from a data item associated with the Kind (e.g., extract metadata from an image, HTML data, etc.). It may be appreciated that the set of initial features may be represented as one or more descriptors of the Kind classification, wherein the one or more descriptors are derived from the extracted features.

One or more dimensions may be created within the Kind feature vector, wherein a probabilistic value may be assigned to respective dimensions based upon the probability the Kind relates to a characteristic of the dimension. For example, a probabilistic value may be assigned based upon one or more descriptors of the Kind classification and/or the set of initial features (e.g., features extracted from data items associated with the Kind).

The Kind feature vector may be updated based upon usage data relating to the Kind classification. In one example, a user may own an image file digitally represented by an image Kind that is characterized by an image Kind classification. The user may rename the image file to "Birthday Party". A new descriptor characterizing the image file as a birthday party may be associated with the image Kind classification. A Kind feature vector associated with the image Kind may be updated based upon updated image Kind classification. For example, an event dimension, a party dimension, and a birthday dimension may be reassigned probabilistic values depicting an increase in the probability that the image relates to such dimensions.

It may be appreciated that other feature vectors may be created, such as a user feature vector. A user feature vector may be created for a user based one or more Kind feature vectors of Kinds associated with the user (e.g., Kinds digitally representing everyday things extracted from data items the user has interacted with). One or more dimensions may be created within the user feature vector. Probabilistic values may be assigned to respective dimensions based upon the probability the user relates to a characteristic of the dimension. For example, a weighted sum may be performed across the one or more Kind feature vectors to determine the probabilistic value of a dimension. That is, a probabilistic value for an air freshener dimension may be determined by summing probabilistic values of air freshener dimensions across the one or more Kind feature vectors associated with the user. If the user is associated with many Kinds relating to air fresheners (e.g., multiple Kind feature vectors have a high probabilistic value relating to air fresheners) then a high probabilistic value may be assigned to the air freshener dimension of the user feature vector.

The user feature vector may be analyzed to determine interests of the user (e.g., a high probabilistic value of a dimension may indicate the user has an interest in the characteristic of the dimension). For example, a sports dimension may be assigned a 0.63 probabilistic value within a user feature vector. This may indicate that the user has a high interest in sports (e.g., the user may blog about sports; the user may receive emails regarding sports; the user may subscribe to sports newsfeeds, etc.). In comparison, a cooking dimension may be assigned a 0.01 probabilistic value within the user feature vector. This may indicate that the user has little interest in cooking (e.g., the user may have interacting with a website once regarding how to cook wings for a sporting event).

The user feature vector may be updated based upon user interaction with a data item (e.g., web content, local content, subscription content, shared content, etc.). For example, the user may subscribe to a gardening newsletter. A garden dimension may be created within the user feature vector and assigned an appropriate probabilistic value. The user may begin to frequently participate in online discussions about gardening. An updated probabilistic value may be assigned to reflect a higher probability that the user relates to gardening. At 206, the method ends.

Figure 3:
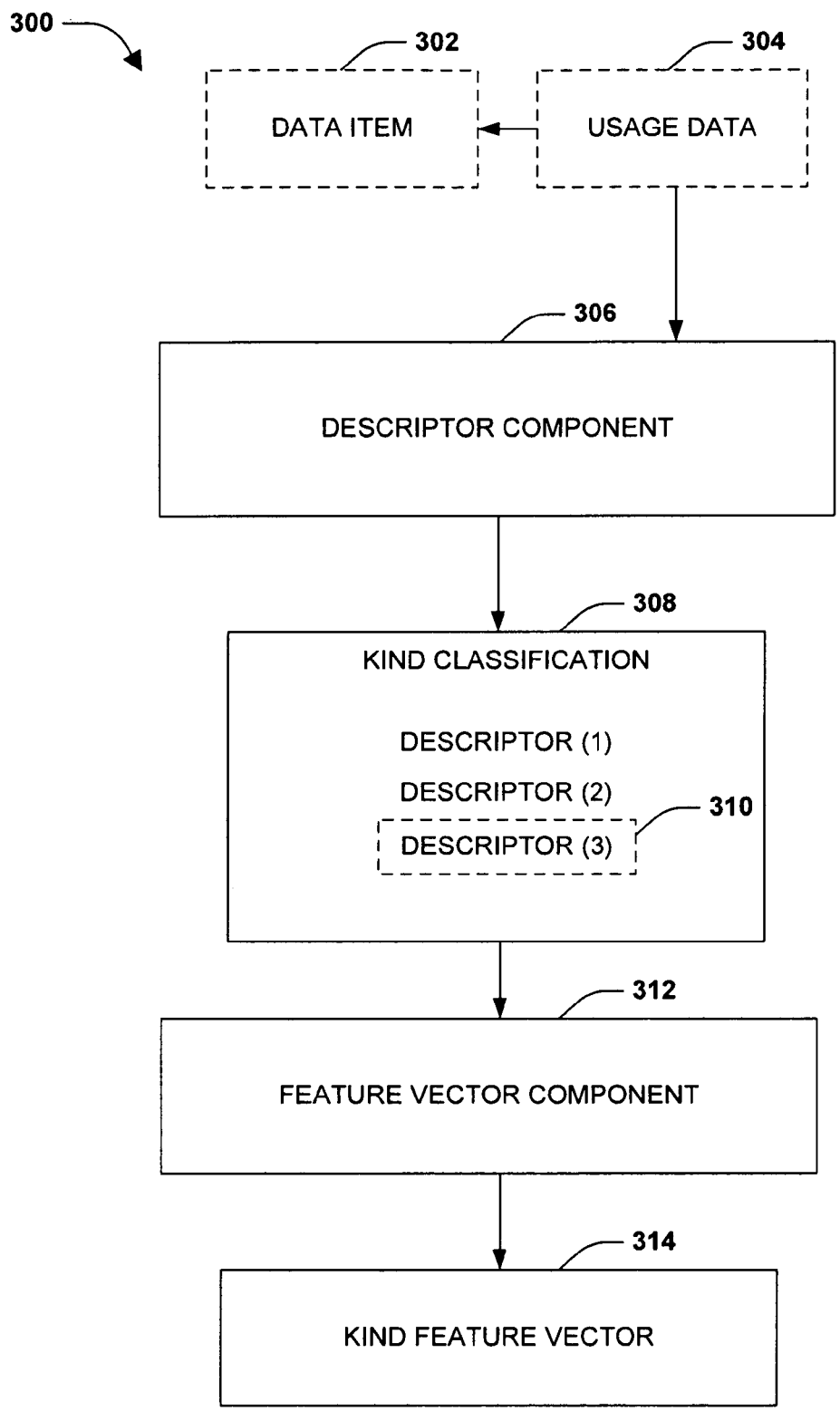
FIG. 3 is a component block diagram illustrating an exemplary system for managing Kind classifications.

FIG. 3 illustrates an example 300 of a system configured for managing Kind classifications (e.g., updating a Kind classification and creating a Kind feature vector). The system may comprise a descriptor component 306 and/or a feature vector component 312. The descriptor component 306 may be configured to associate one or more descriptors with a Kind classification 308 based upon usage data 304. The descriptor component 306 may be configured to associate one or more descriptors with a Kind classification 308 based upon extracted features of a data item associated with the Kind classification 308 (e.g., the data item may relate to a Kind characterized by the Kind classification).

In one example, the usage data 304 may be a user writing a blog entry, a data item 302, about mixing drinks with orange juice. It may be determined that an orange Kind is comprised within the blog entry (e.g., the text is analyzed to determine the word orange is used within the blog entry). The orange Kind may comprise an orange Kind classification, the Kind classification 308, wherein the orange Kind classification characterizes the orange Kind through descriptors. For example, descriptor (1) may characterize the orange Kind as a fruit and descriptor (2) may characterize the orange Kind as a cleaning product. The descriptor component 306 may associate a new descriptor, a descriptor (3) 310, based upon the usage data 304 in which the user wrote about mixing drinks with orange juice. The descriptor (3) 310 may characterize the orange Kind within the Kind classification 308 as being useful in mixing drinks. It may be appreciated that descriptor (1), descriptor (2), and/or descriptor (3) 310 may be derived from the usage data 304 and/or extracted features of the data item 302.

The feature vector component 312 may be configured to create a Kind feature vector 314 based on one or more descriptors (e.g., descriptor (1), descriptor (2), and descriptor (3) 310) associated with the Kind classification 308. It may be appreciated that one or more descriptors may have been derived from a set of initial features and/or assigned by the descriptor component 306. One or more dimensions may be created within the Kind feature vector 314 based upon the one or more descriptors. For example, a fruit dimension, a cleaning product dimension, and a drink mixer dimension may be created within the orange based upon an orange Kind classification comprising descriptors relating to fruit, cleaning products, and/or drink mixers. Probabilistic values may be assigned to respective dimensions within the orange Kind feature vector based upon the probability an orange Kind characterized by the orange Kind classification relates to a characteristic of respective dimension. For example, a probabilistic value of 0.8 may be assigned to the fruit dimension because there is a high probability that the orange Kind relates to a fruit. The probabilistic value may be created based upon one or more descriptors characterizing the orange Kind as a fruit.

Figure 4:
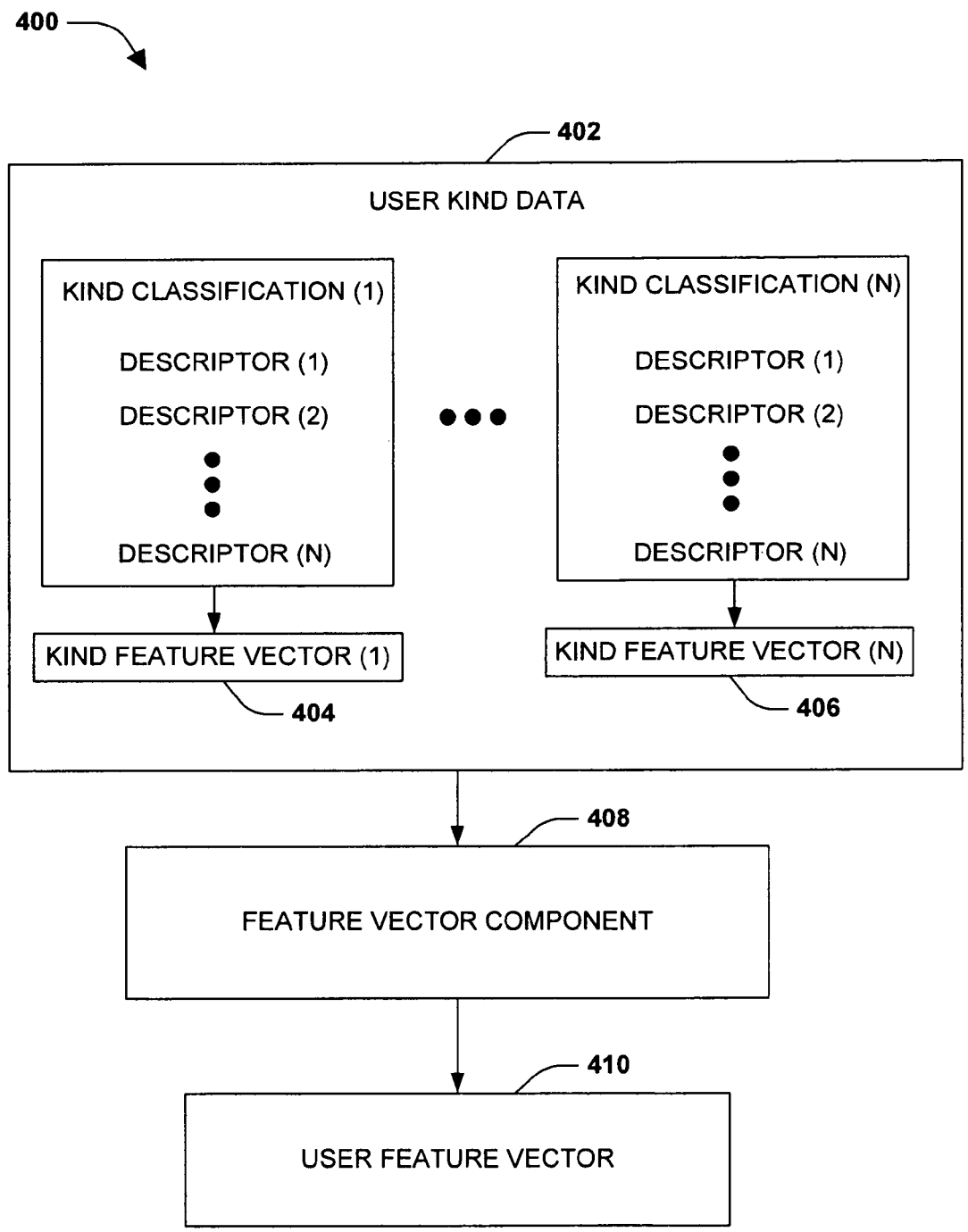
FIG. 4 is a component block diagram illustrating an exemplary system for managing Kind classifications.

FIG. 4 illustrates an example 400 of a system configured for managing Kind classifications (e.g., creating a user feature vector). The system may comprise a feature vector component 408. The feature vector component 408 may be configured to create a user feature vector 410 based upon user Kind data 402, such as Kind feature vectors associated with a user (e.g., a Kind feature vector (1) 404 through Kind feature vector (N) 406). It may be appreciated that the one or more Kind feature vectors may have been derived from one or more Kind classifications. For example, Kind feature vector (1) 404 may have been derived from descriptors of Kind classification (1).

In one example, a weighted sum may be performed across the Kind feature vectors to create the user feature vector 410. One or more dimensions may be created within the user feature vector 410. Probabilistic values may be assigned to respective dimensions based upon the probability the user relates to a characteristic of a dimension. For example, a high probabilistic value (e.g., 0.75) may be assigned to an orange dimension if the user writes about oranges, receives emails regarding oranges, and has pictures of oranges. That is, a probabilistic value for a particular dimension within the user feature vector 410 may be derived by summing respective probabilistic values of a dimension across the one or more Kind feature vectors (e.g., sum orange dimensions from Kind feature vector (1) 404 up to Kind feature vector (N)).

Figure 5:
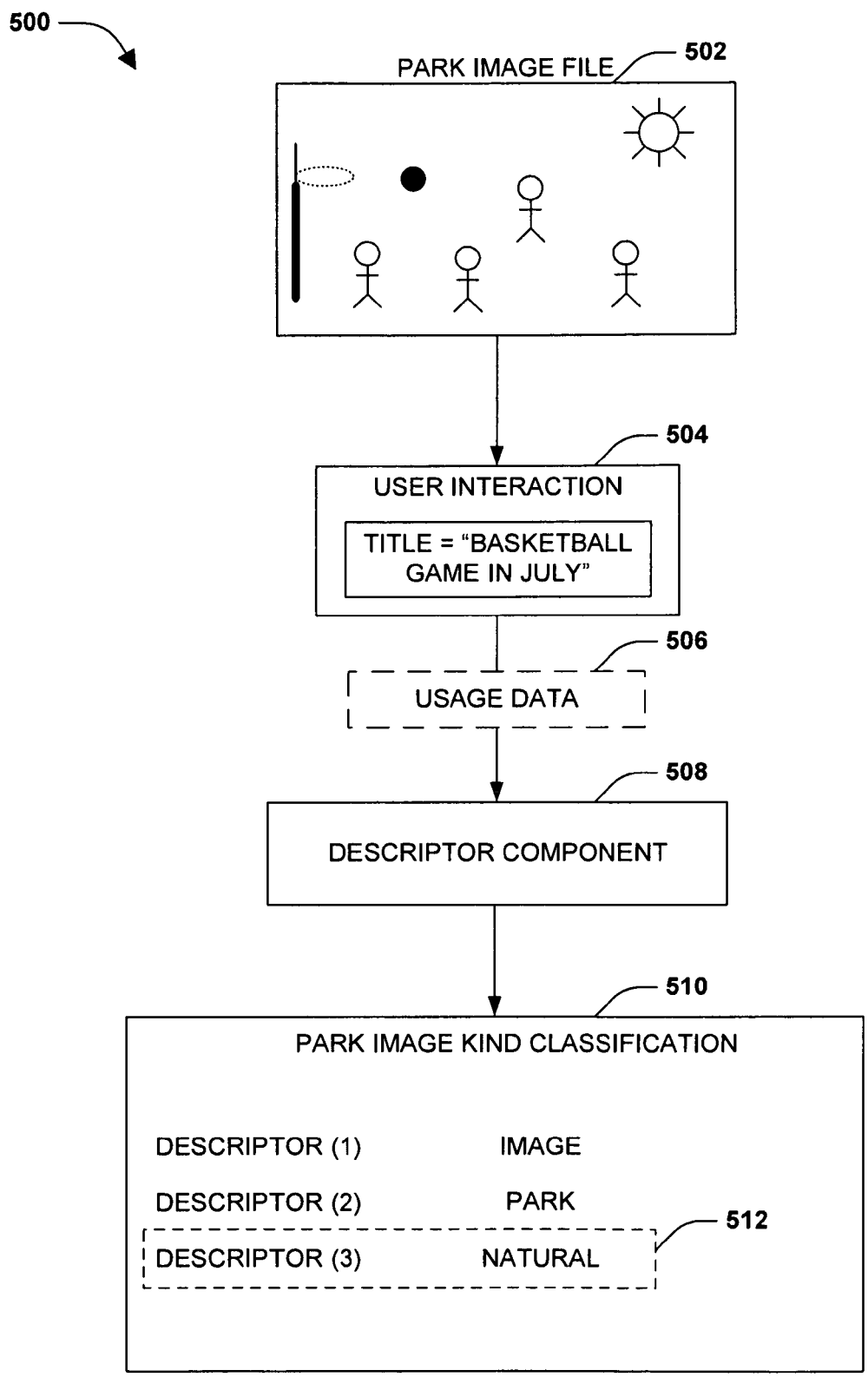
FIG. 5 is an illustration of an example of updating a Kind classification based upon emergent semantic analysis.

FIG. 5 illustrates an example 500 of updating a Kind classification based upon emergent semantic analysis. A user may have a park image file 502 stored locally, for example. The park image file 502 may be associated with a park image Kind characterized by a park image Kind classification 510 (e.g., the park image Kind is a digital representation of the park image file 502). The park image Kind classification 510 may characterize the park image Kind using descriptors (e.g., descriptor (1) image and descriptor (2) park).

User interaction 504 may be performed upon the park image file 502 by the user. For example, the user may rename the title of the park image file 502 to "Basketball game in July". Usage data 506 may be derived from the user interaction 504 of renaming the title (e.g., the text of the renamed title may be extracted into the usage data 506 as a feature). A descriptor component 508 may associate a descriptor (3) sports 512 with the park image Kind classification 510 based upon the usage data 506. The descriptor (3) 512 sports may characterize the park image Kind as sports because the usage data 506 may comprise a sports feature extracted from the text "basketball" in the renamed title of the park image file 502 (e.g., the user characterized the park image file 502 as relating to sports through the user interaction 504). The park image Kind classification 510 now characterizes the park image file 502 as an image, a park, and sports using descriptors (1), (2), and (3) respectively. The park image Kind classification 510 may be utilized in creating a park image Kind feature vector.

Figure 6:
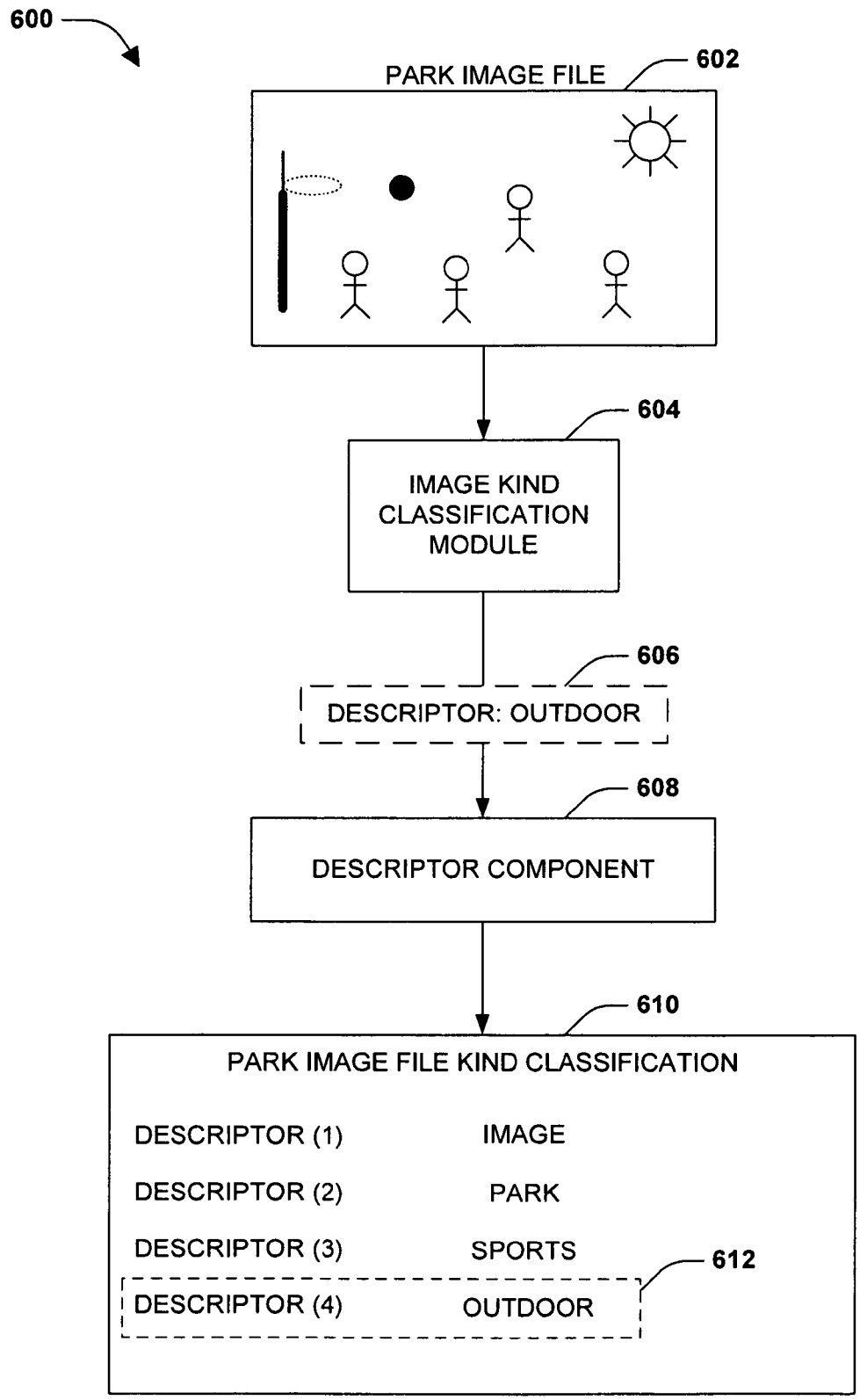
FIG. 6 is an illustration of an example of updating a Kind classification using a Kind classification module.

FIG. 6 illustrates an example 600 of updating a Kind classification using a Kind classification module. An image Kind classification module 604 may be executed upon a park image file 602. The image Kind classification module 604 may extract one or more features of the park image file 602 as a descriptor 606. For example, the image Kind classification module 604 may extract a feature describing the park image file 602 as having a large number of non-primary colors. A determination may be made that the park image file 602 is a natural image as opposed to a synthetic image. The image Kind classification module 604 may create the descriptor 606 as natural based upon the extracted features.

A descriptor component 608 may update a park image Kind classification 610 characterizing a park image Kind associated with the park image file 602 using the descriptor 606. The descriptor component 608 may create a descriptor (4) natural 612 characterizing the park image file 602 as natural. Once updated, the park image Kind classification 610 characterizes the park image Kind as an image, a park, sports, and natural. The park image Kind classification 610 may be utilized in creating a park image Kind feature vector.

Figure 7:
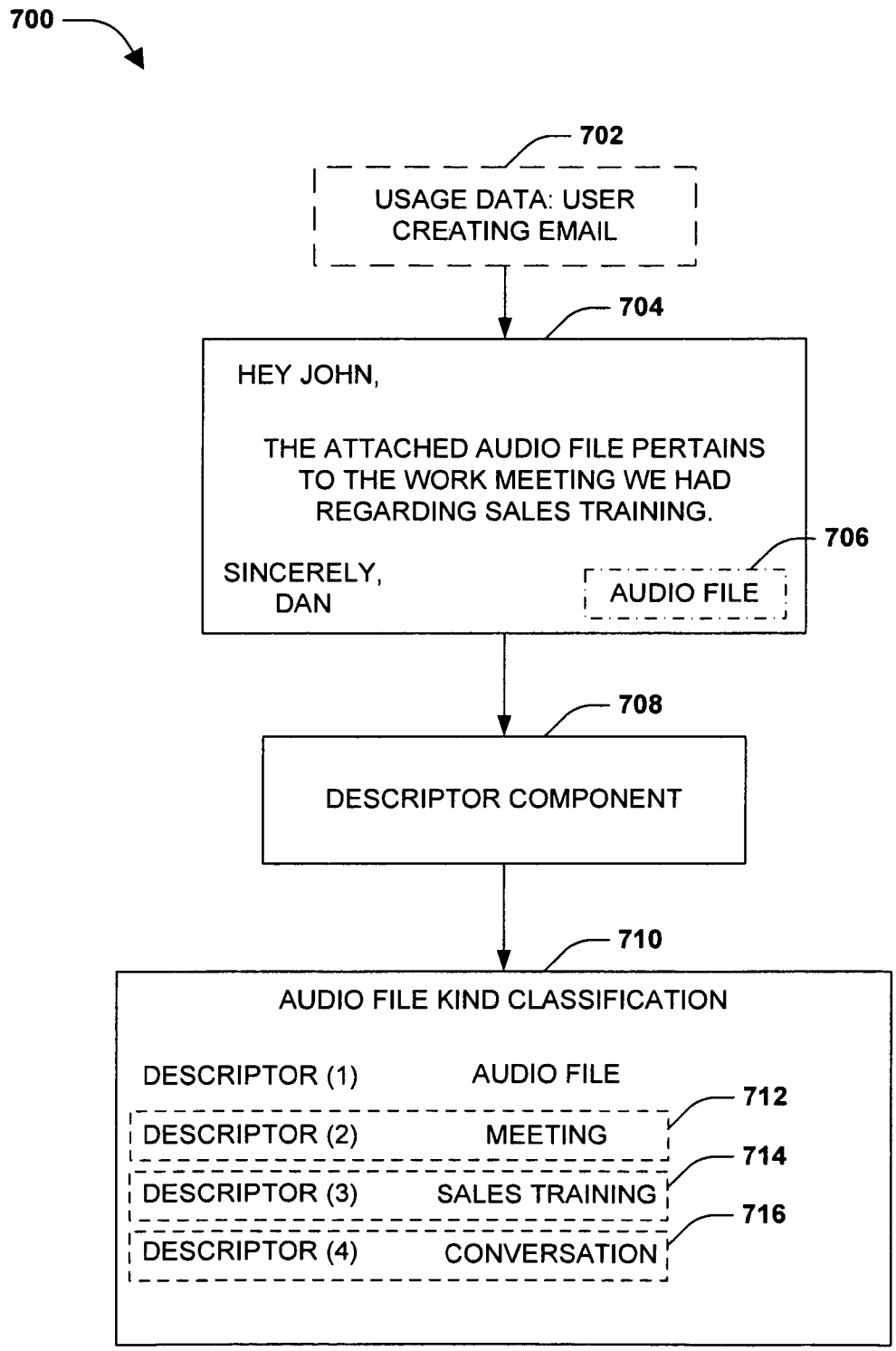
FIG. 7 is an illustration of an example of updating a Kind classification based upon emergent semantic analysis.

FIG. 7 illustrates an example 700 of updating a Kind classification based upon emergent semantic analysis. A user may have a locally stored audio file 706 digitally represented by an audio file Kind characterized by an audio file Kind classification 710. The audio file Kind classification 710 may comprise a descriptor (1) characterizing the audio file Kind as an audio file (e.g., the audio file characterization may have been extracted from the file extension of the audio file 706).

The user may write an email 704 regarding the audio file 706, which may, for example, be attached to the email 704 (e.g., usage data 702). The email 704 may describe the audio file 706 (e.g., pertains to work meeting, regards sales training, etc.). A descriptor component 708 may utilize the usage data 702 to associate descriptors with the audio file Kind classification 710. The descriptor component 708 may extract features from the email 704 characterizing the audio file Kind. For example, based upon the text of the email 704, the descriptor component 708 may determine the audio file 706 pertains to a work meeting and regards sales training. The descriptor component 708 may also determine the audio file 706 is a conversation, which may be derived from the feature that the audio file 706 pertains to a work meeting. The descriptor component 708 may create one or more descriptors (e.g., descriptor (2) meeting 712, descriptor (3) sales training 714, and descriptor (4) conversation 716) based upon the extracted features of the email 704. The audio file Kind classification 710 now characterizes the audio file Kind as an audio file, a meeting, sale training, and a conversation. The audio file Kind classification 710 may be utilized in creating an audio file Kind feature vector.

Figure 8:
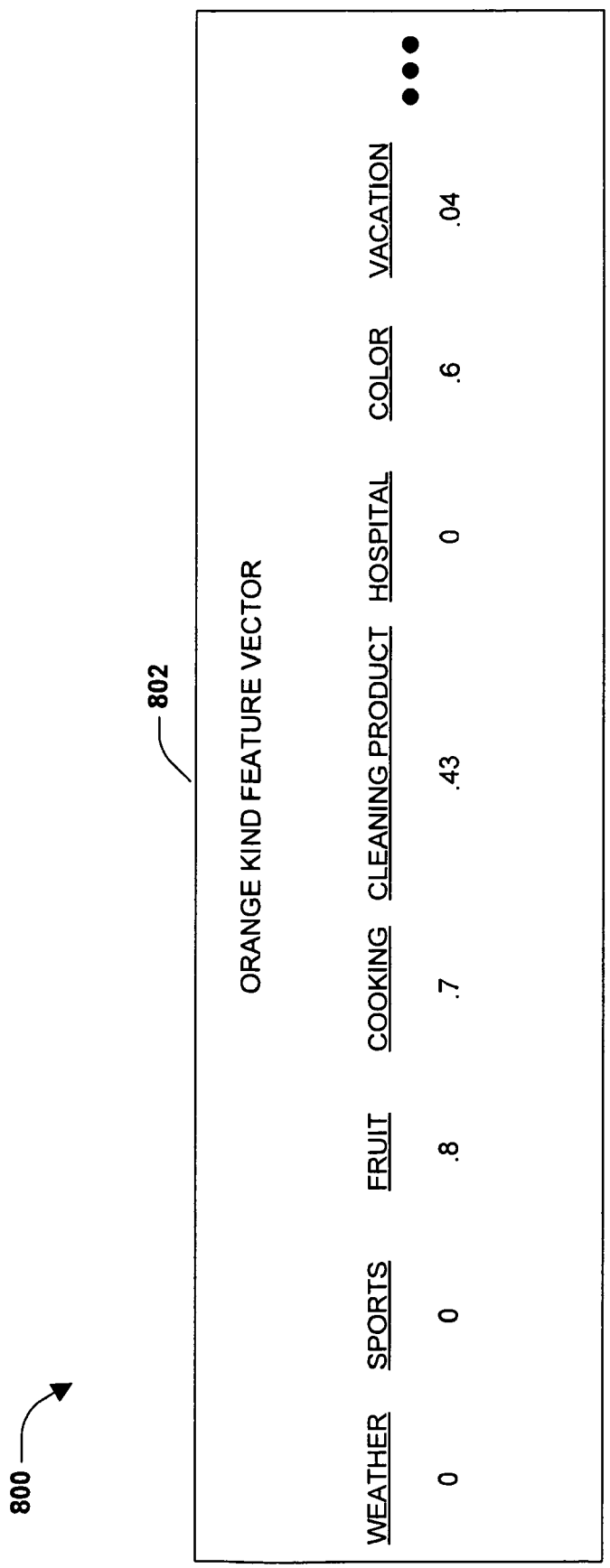
FIG. 8 is an illustration of an example of a Kind feature vector.

FIG. 8 is an example 800 of a Kind feature vector. An orange Kind feature vector 802 may be created from an orange Kind classification comprising one or more descriptors characterizing an orange Kind. The orange Kind classification may comprise descriptors derived from, for example, an image of an orange, an email regarding an orange, a website describing benefits of an orange, and/or a user created document describing orange peels as air fresheners. The orange Kind feature vector 802 may comprise one or more dimensions (e.g., a weather dimension, a sports dimension, a fruit dimension, a cooking dimension, a cleaning product dimension, a hospital dimension, a color dimension, a vacation dimension, and/or other dimensions). A probabilistic value may be assigned to a dimension based upon the probability the orange Kind relates to a characteristic of the dimension.

For example, it may be determined that the orange Kind has a high probability of relating to the fruit dimension (e.g., the orange Kind classification has many descriptors relating to fruit), thus a 0.8 probabilistic value may be assigned to the fruit dimension. It may be determined that the orange Kind has a low probability of relating to the vacation dimension (e.g., the orange Kind classification has a single descriptor characterizing the orange Kind as having some relation to vacations), thus a 0.04 probabilistic value may be assigned to the vacation dimension.

It may be appreciated that the orange Kind feature vector 802 illustrated in example 800 is just one example of a feature vector. A feature vector may be represented and/or stored through a variety of techniques. For example, the feature vector may be an array, a multi-dimensional array, database entries within a database, a mathematical model, and/or any other appropriate data structures.

Figure 9:
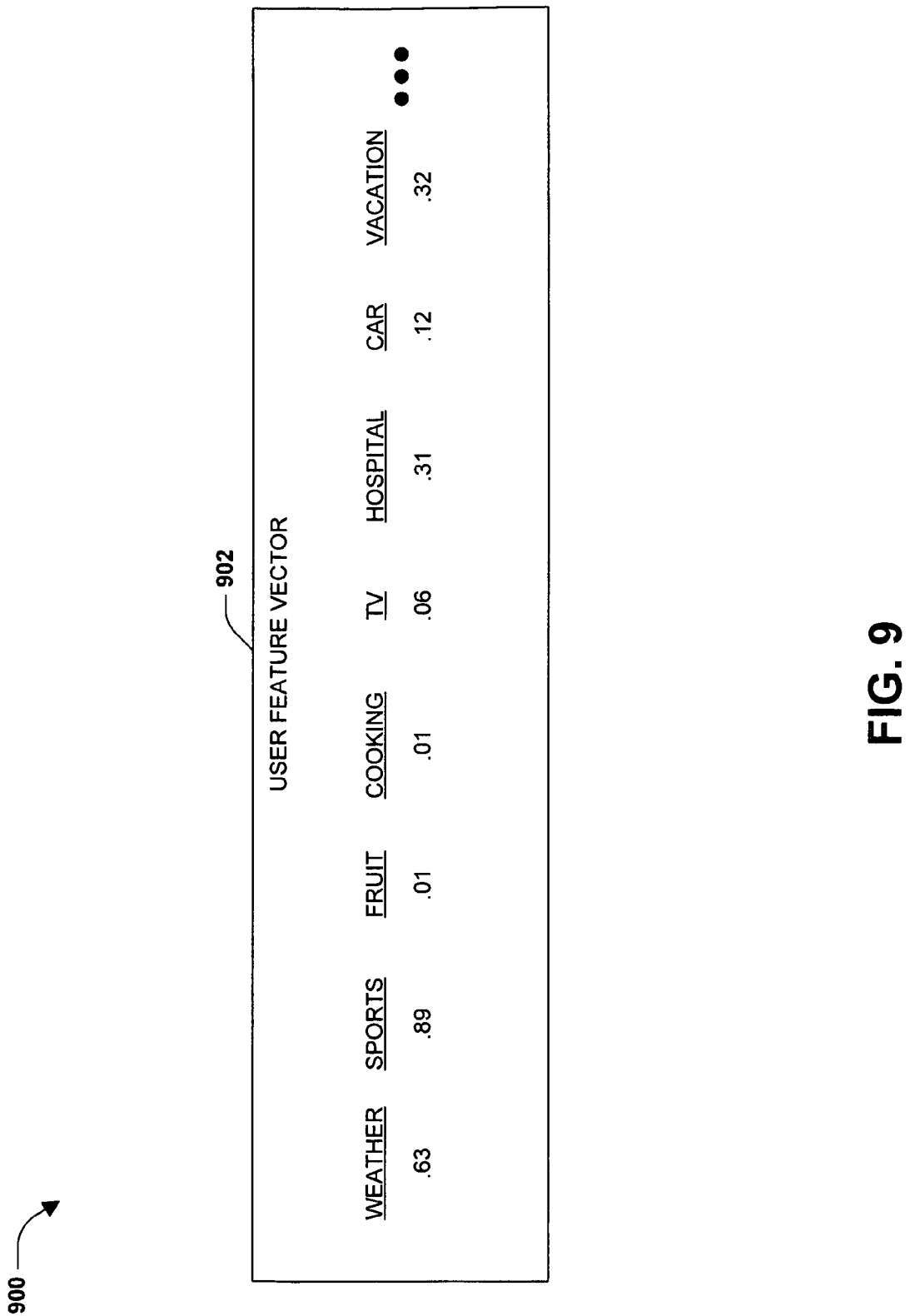
FIG. 9 is an illustration of an example of a user feature vector.

FIG. 9 is an example 900 of a user feature vector. A user feature vector 902 may be created for a user based upon one or more Kind feature vectors (e.g., probabilistic values of dimensions within Kind feature vectors) of Kinds associated with the user. The user feature vector 902 may comprise one or more dimensions, wherein a dimension corresponds to a characteristic. A probabilistic value may be assigned to a dimension based upon the probability the user relates to a characteristic of the dimension. For example, in assigning a probabilistic value to a weather dimensions a weighted sum may be performed upon probabilistic values of weather dimensions across one or more Kind feature vectors associated with the user. The user feature vector 902 may be analyzed to determine, for example, that the user is interested in weather and sports, but has little interest in fruit and cooking.

It may be appreciated that the user Kind feature vector 902 illustrated in example 900 is just one example of a feature vector. A feature vector may be represented and/or stored through a variety of techniques. For example, the feature vector may be an array, a multi-dimensional array, database entries within a database, a mathematical model, and/or any other appropriate data structures.

Figure 10:
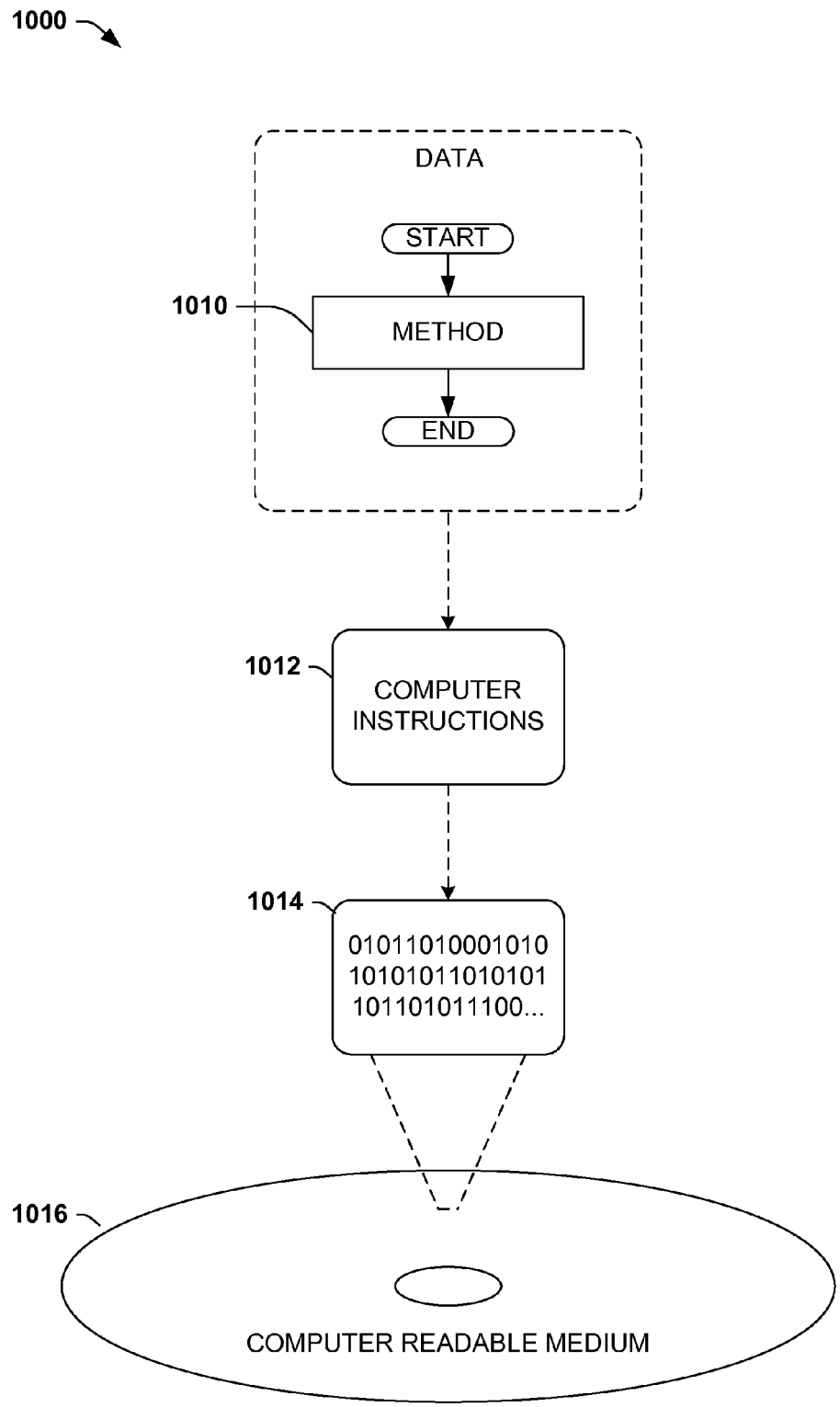
FIG. 10 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 10, wherein the implementation 1000 comprises a computer-readable medium 1016 (e.g., a CD-R, DVD-R, or a platter of a hard disk drive), on which is encoded computer-readable data 1014. This computer-readable data 1014 in turn comprises a set of computer instructions 1012 configured to operate according to one or more of the principles set forth herein. In one such embodiment 1000, the processor-executable instructions 1012 may be configured to perform a method 1010, such as the exemplary method 100 of FIG. 1, for example. In another such embodiment, the processor-executable instructions 1012 may be configured to implement a system, such as the exemplary system 300 of FIG. 3 and the exemplary system 400 of FIG. 4, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 11:
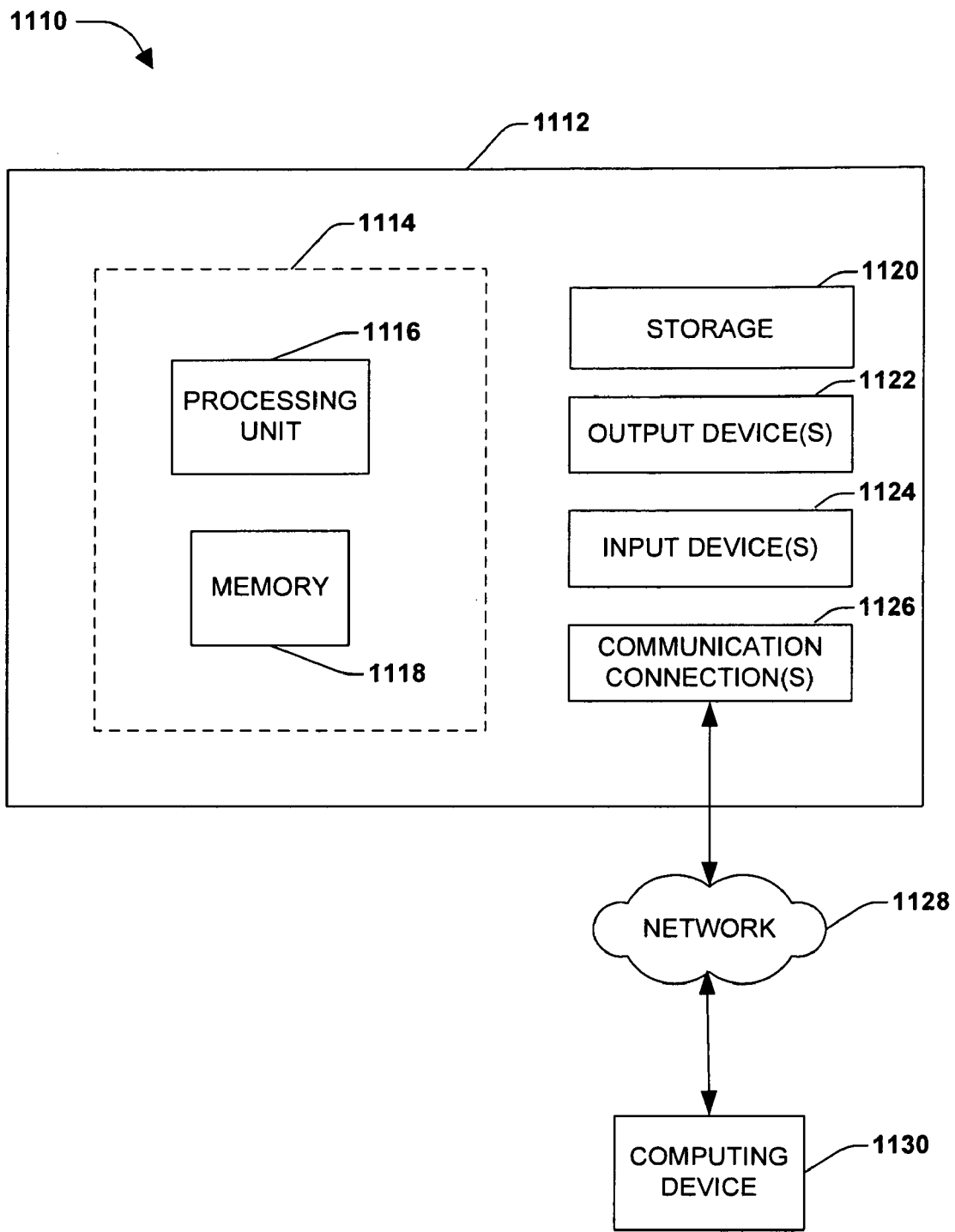
FIG. 11 illustrates an exemplary computing environment wherein one or more of the provisions set forth herein may be implemented.

FIG. 11 and the following discussion provide a brief, general description of a suitable computing environment to implement embodiments of one or more of the provisions set forth herein. The operating environment of FIG. 11 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 11 illustrates an example of a system 1110 comprising a computing device 1112 configured to implement one or more embodiments provided herein. In one configuration, computing device 1112 includes at least one processing unit 1116 and memory 1118. Depending on the exact configuration and type of computing device, memory 1118 may be volatile (such as RAM, for example), non-volatile (such as ROM, flash memory, etc., for example) or some combination of the two. This configuration is illustrated in FIG. 11 by dashed line 1114.

In other embodiments, device 1112 may include additional features and/or functionality. For example, device 1112 may also include additional storage (e.g., removable and/or non-removable) including, but not limited to, magnetic storage, optical storage, and the like. Such additional storage is illustrated in FIG. 11 by storage 1120. In one embodiment, computer readable instructions to implement one or more embodiments provided herein may be in storage 1120. Storage 1120 may also store other computer readable instructions to implement an operating system, an application program, and the like. Computer readable instructions may be loaded in memory 1118 for execution by processing unit 1116, for example.

The term "computer readable media" as used herein includes computer storage media. Computer storage media includes volatile and nonvolatile, removable and non-removable media implemented in any method or technology for storage of information such as computer readable instructions or other data. Memory 1118 and storage 1120 are examples of computer storage media. Computer storage media includes, but is not limited to, RAM, ROM, EEPROM, flash memory or other memory technology, CDROM, Digital Versatile Disks (DVDs) or other optical storage, magnetic cassettes, magnetic tape, magnetic disk storage or other magnetic storage devices, or any other medium which can be used to store the desired information and which can be accessed by device 1112. Any such computer storage media may be part of device 1112.

Device 1112 may also include communication connection(s) 1126 that allows device 1112 to communicate with other devices. Communication connection(s) 1126 may include, but is not limited to, a modem, a Network Interface Card (NIC), an integrated network interface, a radio frequency transmitter/receiver, an infrared port, a USB connection, or other interfaces for connecting computing device 1112 to other computing devices. Communication connection(s) 1126 may include a wired connection or a wireless connection. Communication connection(s) 1126 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1112 may include input device(s) 1124 such as keyboard, mouse, pen, voice input device, touch input device, infrared cameras, video input devices, and/or any other input device. Output device(s) 1122 such as one or more displays, speakers, printers, and/or any other output device may also be included in device 1112. Input device(s) 1124 and output device(s) 1122 may be connected to device 1112 via a wired connection, wireless connection, or any combination thereof. In one embodiment, an input device or an output device from another computing device may be used as input device(s) 1124 or output device(s) 1122 for computing device 1112.

Components of computing device 1112 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1112 may be interconnected by a network. For example, memory 1118 may be comprised of multiple physical memory units located in different physical locations interconnected by a network.

Those skilled in the art will realize that storage devices utilized to store computer readable instructions may be distributed across a network. For example, a computing device 1130 accessible via a network 1128 may store computer readable instructions to implement one or more embodiments provided herein. Computing device 1112 may access computing device 1130 and download a part or all of the computer readable instructions for execution. Alternatively, computing device 1112 may download pieces of the computer readable instructions, as needed, or some instructions may be executed at computing device 1112 and some at computing device 1130.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A nonvolatile computer-readable medium comprising processor-executable instructions that when executed perform a method for updating a Kind classification based upon emergent semantic analysis comprising:
receiving usage data relating to a Kind classification;
associating a descriptor with the Kind classification based upon the usage data; and
associating a Kind feature vector with a Kind characterized by the Kind classification, the associating comprising:
creating one or more dimensions within the Kind feature vector; and
for respective dimensions within the Kind feature vector, assigning a probabilistic value to a dimension based upon a probability that the Kind relates to a characteristic of the dimension.

2. The nonvolatile computer-readable medium of claim 1, the usage data corresponding to user interaction with a data item associated with the Kind that is characterized by the Kind classification.

3. The nonvolatile computer-readable medium of claim 2, the data item comprising at least one of:
web content;
local content;
subscription content; or shared content.

4. The nonvolatile computer-readable medium of claim 1, comprising:
creating a user feature vector for a user based upon one or more Kind feature vectors of Kinds associated with the user.

5. The nonvolatile computer-readable medium of claim 4, the creating a user feature vector comprising:
creating one or more dimensions within the user feature vector; and
for respective dimensions within the user feature vector, assigning a probabilistic value to a dimension within the user feature vector based upon the probability the user relates to a characteristic of the dimension.

6. The nonvolatile computer-readable medium of claim 1, the assigning a probabilistic value comprising:
assigning the probabilistic value to the dimension based upon one or more descriptors of the Kind classification.

7. The nonvolatile computer-readable medium of claim 1, comprising:
executing a classification module upon a data item associated with the Kind classification to associate one or more descriptors with the Kind classification.

8. The nonvolatile computer-readable medium of claim 7, the executing comprising:
executing an image Kind classification module upon an image data item associated with an image Kind classification; and
associating one or more descriptors with the image Kind classification based upon at least one of: a color ratio feature, a color saturation feature, or a shape feature.

9. The nonvolatile computer-readable medium of claim 7, the executing comprising:
executing an audio Kind classification module upon an audio data item associated with an audio Kind classification; and
associating one or more descriptors with the audio Kind classification based upon at least one of: a signal to noise ratio feature, a zero crossing feature, or an f domain analysis feature.

10. A method for creating a Kind feature vector, comprising:
creating a Kind feature vector for a Kind using a set of initial features and one or more descriptors of a Kind classification characterizing the Kind, the creating comprising:
creating one or more dimensions within the Kind feature vector; and
for respective dimensions within the Kind feature vector, assigning a probabilistic value to a dimension based upon the probability the Kind relates to a characteristic of the dimension.

11. The method of claim 10, comprising:
identifying the set of initial features based upon at least one of:
one or more descriptors within the Kind classification; or
one or more features extracted from a data item associated with the Kind.

12. The method of claim 10, the assigning a probabilistic value comprising:
assigning the probabilistic value to the dimension based upon one or more descriptors of the Kind classification.

13. The method of claim 10, comprising:
updating the Kind feature vector based upon usage data relating to the Kind classification.

14. The method of claim 13, the updating comprising:
reassigning an updated probabilistic value to a dimension of the Kind feature vector.

15. The method of claim 10, comprising:
creating a user feature vector for a user based upon one or more Kind feature vectors of Kinds associated with the user.

16. The method of claim 15, comprising:
creating one or more dimensions within the user feature vector; and
for respective dimensions within the user feature vector, assigning a probabilistic value to a dimension based upon the probability the user relates to a characteristic of the dimension.

17. The method of claim 16, the assigning a probabilistic value comprising:
performing a weighted sum across the one or more Kind feature vectors to determine the probabilistic value.

18. The method of claim 17, the performing a weighted sum comprising:
summing respective probabilistic values of a dimension across the one or more Kind feature vectors.

19. The method of claim 15, the Kind associated with the user through user interaction with a data item corresponding to the Kind.

20. A system for creating one or more feature vectors, comprising:
a feature vector component configured to:
create a Kind feature vector for a Kind using a set of initial features and one or more descriptors of a Kind classification characterizing the Kind; and
create a user feature vector for a user based upon one or more Kind feature vectors of Kinds associated with the user.

* * * * *